United States Patent
Bando et al.

(10) Patent No.: US 10,442,444 B1
(45) Date of Patent: Oct. 15, 2019

(54) VEHICLE BEHAVIOR AND DRIVER ASSISTANCE MODULES FOR A MOBILE NETWORK DEVICE IMPLEMENTING PSEUDO-VEHICLE BEHAVIOR SIGNAL GENERATION BASED ON MOBILE SENSOR SIGNALS

(71) Applicants: DENSO International America, Inc., Southfield, MI (US); DENSO CORPORATION, Kariya-shi, Aichi-ken (JP)

(72) Inventors: Takashi Bando, Mountain View, CA (US); Hideaki Misawa, Chiryu (JP)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/055,833

(22) Filed: Aug. 6, 2018

(51) Int. Cl.
*B60K 28/02* (2006.01)
*B60W 50/14* (2012.01)
(Continued)

(52) U.S. Cl.
CPC ............ *B60W 50/14* (2013.01); *B60W 40/09* (2013.01); *B60W 40/12* (2013.01); *B60W 50/0097* (2013.01); *H04W 4/48* (2018.02)

(58) Field of Classification Search
CPC ....... G06K 2009/4666; G06K 9/00369; G06K 9/4642; G06K 9/4647; G06K 9/4652; G06K 9/52; G06K 9/6215; G06K 9/6267; G06T 2207/20021; G06T 7/60; G06T 7/90; B60R 16/0232; B60W 2050/0029; B60W 2540/00; B60W 2550/00; B60W 40/09; B60W 50/0097; G01C 21/3626; G06N 20/00; G06N 5/04; G07C 5/008; G07C 5/0866; G08G 1/0112; G08G 1/0116; G08G 1/0129; G08G 1/0137; G08G 1/0141;
(Continued)

(56) References Cited

U.S. PATENT DOCUMENTS 7,079,927 B1 * 7/2006 Tano .................. G01C 21/26
 701/25
9,628,975 B1 * 4/2017 Watkins .................. H04W 4/90
(Continued)

OTHER PUBLICATIONS

"Sequence to Sequence Learning with Neural Networks," I. Sutskever, O. Vinyals and Q. Le, NIPS, 2014.

*Primary Examiner* — Daniel Previl
(74) *Attorney, Agent, or Firm* — Harness, Dickey & Pierce, P.L.C.

(57) ABSTRACT

A mobile network device is provided and includes a memory and a control module. The memory is configured to store a driver assistance application. The control module is configured to execute the driver assistance application and when executing the driver assistance application the control module is configured to: receive mobile sensor signals from a plurality of sensors in the mobile network device; normalize the mobile sensor signals to generate normalized signals; translate the normalized signals to a plurality of time sequences representing vehicle behavior; concatenate the plurality of time sequences to generate pseudo-vehicle behavior signals; and generate driver assistance signals based on the pseudo-vehicle behavior signals to assist a driver of a vehicle.

31 Claims, 6 Drawing Sheets

(51) Int. Cl.
*B60W 40/09* (2012.01)
*H04W 4/48* (2018.01)
*B60W 40/12* (2012.01)
*B60W 50/00* (2006.01)

(58) Field of Classification Search
CPC ......... G08G 1/09623; G08G 1/096716; G08G 1/096741; G08G 1/096775
USPC ...... 340/439, 933, 942, 436, 425.5, 6.1, 8.1, 340/995.25, 995.13, 426.22, 444
See application file for complete search history.

(56) References Cited

U.S. PATENT DOCUMENTS

| | | | |
|---|---|---|---|
| 2010/0157061 A1* | 6/2010 | Katsman | G07C 5/008 348/149 |
| 2010/0222960 A1* | 9/2010 | Oida | B60G 17/0195 701/31.4 |
| 2011/0071755 A1* | 3/2011 | Ishigami | G01C 21/165 701/478.5 |
| 2014/0106719 A1* | 4/2014 | Chitre | H04W 76/25 455/414.1 |
| 2016/0140779 A1 | 5/2016 | Takenaka et al. | |

\* cited by examiner

VEHICLE BEHAVIOR AND DRIVER ASSISTANCE MODULES FOR A MOBILE NETWORK DEVICE IMPLEMENTING PSEUDO-VEHICLE BEHAVIOR SIGNAL GENERATION BASED ON MOBILE SENSOR SIGNALS

FIELD

The present disclosure relates to vehicle behavior signals generated on a controller area network (CAN) bus.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles can include multiple control modules, such as an engine control module, a transmission control module, an infotainment control module, a navigation control module, etc. The control modules and/or other electronic devices can communicate with each other over a controller area network (CAN) bus. This may include transmission of CAN messages indicative of states of various parameters. A vehicle typically includes various sensors for detection of states of devices in the vehicle and conditions surrounding the vehicle. The sensors may include, for example, a steering wheel position sensor, a brake pedal position sensor, an accelerator position sensor, temperature sensors, a vehicle speed sensor, an engine speed sensor, cameras, radar sensors, etc. Information from the sensors may be shared with the control modules via CAN messages transmitted over the CAN bus.

A vehicle may be equipped with a driver assistance module to assist the driver in operating the vehicle. The driver assistance module may monitor CAN messages and determine states of parameters, devices in the vehicle, and environmental conditions. Based on this information, the driver assistance module may assist the driver by generating, for example, warning signals to indicate to the driver to brake or steer the vehicle to remain in a traffic lane and/or avoid a collision.

SUMMARY

A mobile network device is provided and includes a memory and a control module. The memory is configured to store a driver assistance application. The control module is configured to execute the driver assistance application and when executing the driver assistance application the control module is configured to: receive mobile sensor signals from a plurality of sensors in the mobile network device; normalize the mobile sensor signals to generate normalized signals; translate the normalized signals to a plurality of time sequences representing vehicle behavior; concatenate the plurality of time sequences to generate pseudo-vehicle behavior signals; and generate driver assistance signals based on the pseudo-vehicle behavior signals to assist a driver of a vehicle.

In other features, a method of operating a mobile network device is provided. The method includes storing a driver assistance application in a memory of the mobile network device and executing the driver assistance application to: receive mobile sensor signals from a plurality of sensors in the mobile network device; normalize the mobile sensor signals to generate normalized signals; translate the normalized signals to a plurality of time sequences representing vehicle behavior; concatenate the plurality of time sequences to generate pseudo-vehicle behavior signals; and generate driver assistance signals based on the pseudo-vehicle behavior signals to assist a driver of a vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
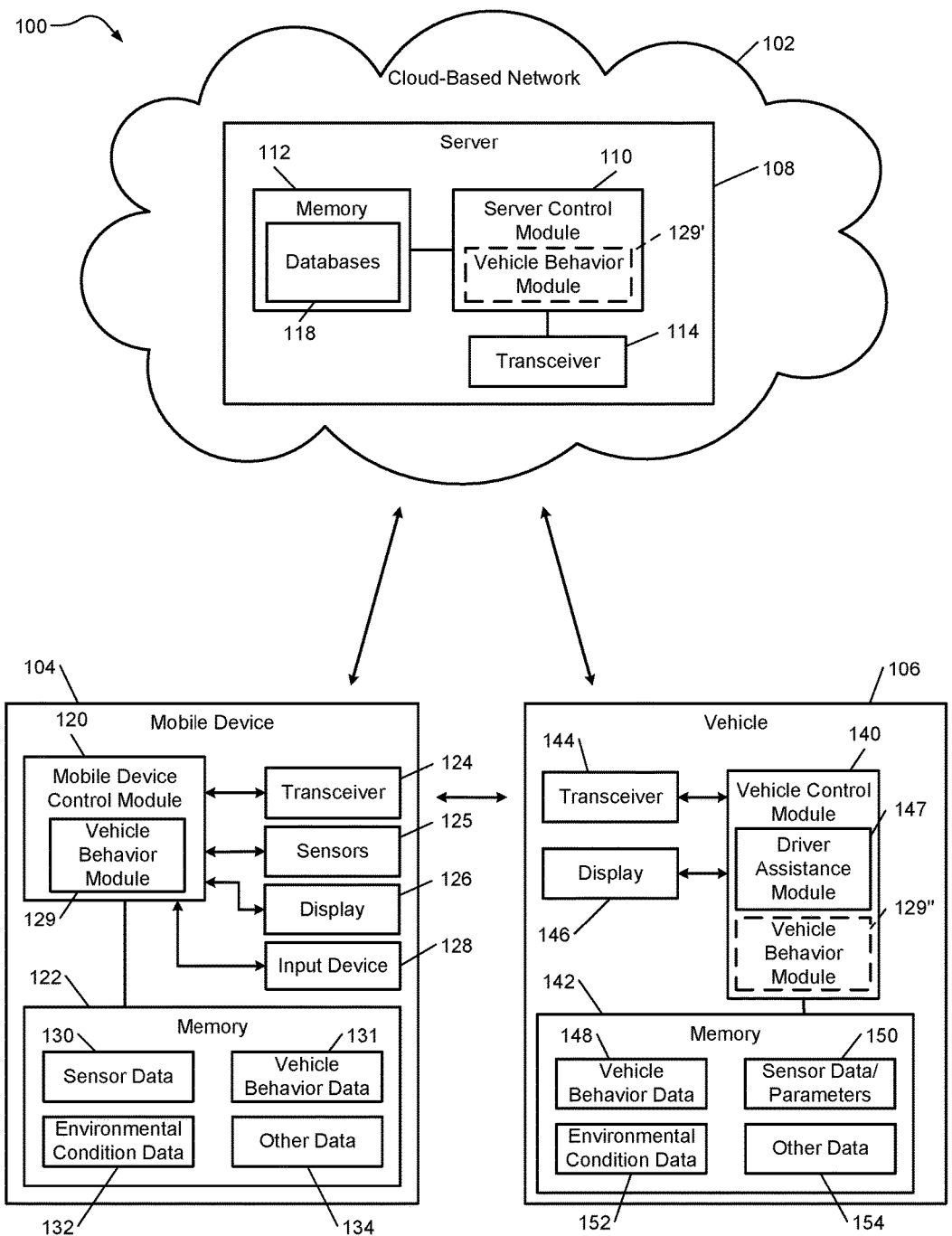
FIG. 1 is a functional block diagram of an example of a driver assistance system in accordance with an embodiment of the present disclosure.

Recent intelligent vehicles include various sensors, which are used to understand current driver behavior. Driver assistance is provided in a vehicle based on outputs of the sensors and a detected operating environment. For example, a steering wheel angle, a brake pedal position, and an accelerator pedal position may be monitored to determine driver behavior while external radar sensor signals and camera images may be monitored to detect a current vehicle environment. This may include detection of lane markers, surrounding objects, signal lights, etc. Driver assistance may be provided to, for example, autonomously steer, brake and/or decelerate the corresponding vehicle to prevent a collision. Conventional vehicles or vehicles that are less intelligent are not capable of providing a same level of driver assistance or are simply unable to provide any driver assistance.

The examples set forth herein include mobile devices equipped with mobile sensors, vehicle behavior modules and driver assistance modules to generate vehicle behavior signals (referred to also herein as "pseudo-controller area network signals" or "pseudo-CAN signals") and based on these signals assist drivers of vehicles. Although referred to as vehicle behavior signals, the vehicle behavior signals may include driver behavior signals. For example, a steering wheel angle signal, a brake pedal position signal, and an accelerator pedal position signal are vehicle behavior signals and may also be referred to as driver behavior signals depending on whether these signals are generated based on driver behavior or are generated based on autonomous control provided by a vehicle control module.

The pseudo CAN signals are generated based on mobile sensors in the mobile devices and may be monitored by the vehicle behavior modules and driver assistance modules of the mobile devices. Based on outputs of the sensors, the driver assistance modules may generate signals to assist drivers as further described below. The pseudo CAN signals and/or driver assistance signals may be transmitted from the mobile devices to other driver assistance modules of the vehicles if the vehicles are equipped for such reception. The pseudo CAN signals and/or driver assistance signals may also be transmitted from the mobile devices to cloud servers to provide cloud based connected service. The driver assistance modules of the vehicles may then provide additional driver assistance.

The examples provided herein include vehicle behavior modules that predict driver behaviors based on current and/or past vehicle and/or driver behaviors. The more a vehicle behavior module is able to determine a current driver behavior and the better the vehicle behavior module is able to predict the behavior (or upcoming actions) of a driver, the better a driver assistance module is able to assist the driver. The better and more proactive the assistance provided, the more "rich" the driving experience. This includes not providing assistance if assistance is not needed. As an example, if the driver vehicle behavior module detects an upcoming object and also detects that the driver is braking, then the driver assistance module may not provide driver assistance to decelerate the vehicle. However, if the vehicle behavior module does not detect that the driver is braking and/or that the vehicle is not decelerating a quick enough rate, then the driver assistance module may increase brake pressure, brake torque an engine, and/or steer the vehicle to avoid a collision.

FIG. 1 shows a driver assistance system 100 that includes a cloud-based network 102, a mobile network device (referred to herein as "mobile device") 104, and a vehicle 106. The cloud-based network 102 includes one or more servers (one server 108 is shown). Although a single mobile device 104, a single vehicle 106 and a single server 108 are shown, any number of each may be included in the driver assistance system 100. The server 108 may include a server control module 110, a memory 112, and a transceiver 114. The memory 112 may store databases 118, which may include sensor data, vehicle behavior data, environmental condition data, and/or other related data received from the mobile device 104 and/or the vehicle 106. The stated data may be shared by the server with the vehicles in the driver assistance system 100. The vehicle parameter data may include engine parameters (e.g., engine speed, engine temperatures, etc.), vehicle speed, brake pedal position, accelerator pedal position, steering wheel angle position, etc. The environmental condition data may include distances between the corresponding vehicle and objects or lane markings, speeds of objects relative to the vehicle, directions of travel of the vehicle and/or objects, temperatures, weather conditions, and/or other environmental conditions.

The mobile device 104 may be a mobile phone, a laptop computer, a personal data assistant device, a wearable device, dashboard camera ("dash-cam"), drive recorder and/or other portable network device. Although the mobile devices referred to herein may be located in the vehicle 106 and/or other vehicles, the mobile devices are not manufactured as part of the vehicles and may wirelessly communicate with the vehicles or be plugged into the vehicles via, for example, a universal serial bus (USB) cable. The mobile device 104 may include a mobile device control module 120, a memory 122, a transceiver 124, sensors 125, a display 126 and an input device 128 (e.g., a touch screen, a mouse, a keyboard, etc.). The mobile device control module 120 may include a vehicle behavior module 129. Although the vehicle behavior module 129 is shown as being implemented in the mobile device 104, at least a portion of the vehicle behavior module may be implemented in the server 108 and/or in the vehicle 106, as represented by the vehicle behavior modules 129' and 129". The memory 122 may store sensor data and/or corresponding parameters 130, vehicle behavior data 131, environmental condition data 132, and/or other data 134. The vehicle behavior data may include data collected from the sensors 125. The sensors 125 may include accelerometers, gyro sensors, cameras, global-positioning system sensors, etc. and generate the sensor data. The display 126 may be used to provide driver assistance signals to a driver, as further described below.

The vehicle 106 may include a vehicle control module 140, a memory 142, a transceiver 144, and a display 146. The memory 142 may store vehicle behavior data 148, vehicle sensor data and/or parameters 150, environmental condition data 152 and other data 154. The display 146 may be a display on a dashboard of the vehicle 106, a heads-up-display, or other display within the vehicle 106 and used to provide driver assistance signals to a vehicle operator. The driver assistance signals may be generated by the driver assistance module 147, may be received from the server 108 and/or the mobile device 104, and/or be generated based on signals from the server 108 and/or the mobile device 104. The control modules 110, 120, 140 may communicate with each other via the transceivers 114, 124, 144.

Figure 2:
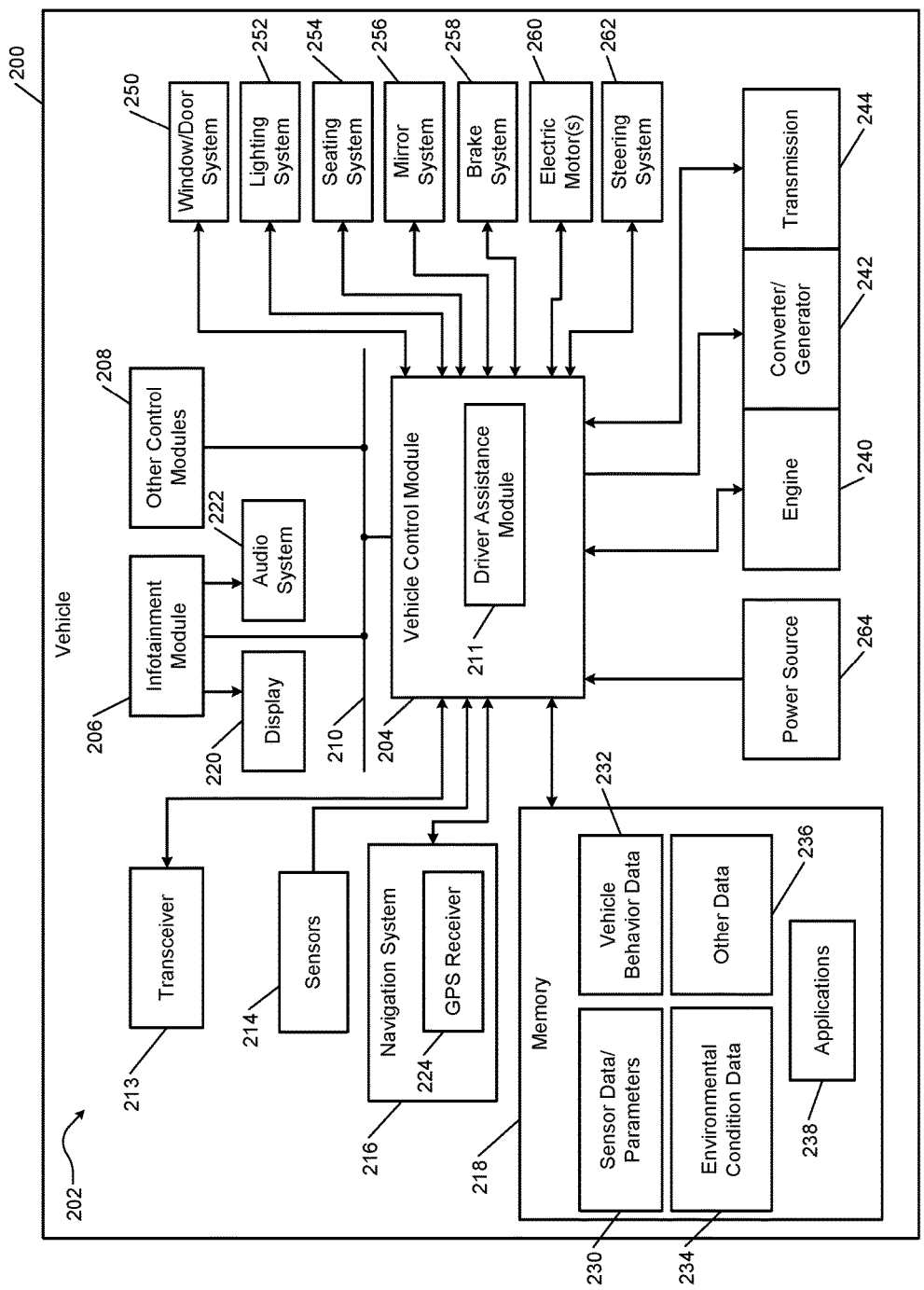
FIG. 2 is a functional block diagram of an example of a mobile device including a vehicle behavior module and a driver assistance module in accordance with an embodiment of the present disclosure.

FIG. 2 shows a vehicle 200 that may include an operating system 202. The vehicle 200 may replace and/or operate similarly to the vehicle 106 of FIG. 1. The operating system 202 may include a vehicle control module 204, an infotainment module 206, and other control modules 208, which may communicate with each other via a controller area network (CAN) bus 210. The vehicle control module 204 may operate similar to the vehicle control module 140 of FIG. 1 and includes a driver assistance module 211 and/or other modules, such as an autonomous control module, engine control module, a transmission control module, and a motor control module, etc. The driver assistance module 211 may assist a driver of the vehicle (i) passively by signaling the driver with suggested operations to perform and/or warning signals, or (ii) actively by assisting and/or controlling operations of one or more actuators and/or devices of the vehicle 200. This may include adjusting set parameters of the vehicle 200. The driver assistance module 211 may communicate with and/or receive vehicle behavior signals, driver assistance signals, and/or other signals from one of the mobile devices, cloud-based network servers, and vehicles described herein via the transceiver 213.

The operating system 202 may further include a transceiver 213, sensors 214, a navigation system 216, a memory 218, a display 220 and an audio system 222. The sensors 214 may include cameras, objection detection sensors, temperature sensors, accelerometers (or acceleration sensors for detecting acceleration in X, Y, Z directions or yaw, pitch and roll), a vehicle velocity sensor and/or other sensors that provide parameters and/or data associated with the state of the vehicle 200, state of objects within the vehicle 200, and/or information regarding an environment in which the vehicle 200 is located. The sensors 214 detect environmental conditions and status of vehicle devices. The navigation system 216 may include a global positioning system (GPS) receiver 224. The GPS receiver 224 may provide vehicle velocity and/or direction (or heading) of the vehicle. In one embodiment, the vehicle control module 204 transmits at least some of the data collected from the sensors 214 to a mobile device (e.g., one of the mobile devices described herein). In one embodiment, the vehicle 200 does not include some or all of the sensors 214, the CAN bus 210, and/or the driver assistance module 211.

The memory 218 may store sensor and/or parameter data 230, vehicle behavior data 232, environmental condition data 234, other data 236, and applications 238. The applications 238 may include applications executed by the modules 204, 206, 208. As an example, one of the applications may be a driving assistance application executed by the driver assistance module 211 and used to assist a driver of the vehicle 200.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the vehicle control module 204 and/or one or more of the other modules 208. The vehicle control module 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control modules 204 to, for example, adjust fuel, spark, air flow, throttle position, pedal position, door locks, window position, seat angles, lumbar support positions and/or pressures, mirror position, stereo presets, etc. This control may be based on the outputs of the sensors 214, the navigation system 216, and the GPS receiver 224. The stated control may also be performed to match parameters of a user profile, which may be adjusted by a user. The audio system 222 may include a stereo having channel presets and volume settings that maybe set by a user and adjusted according to a user profile by one or more of the modules 204, 206, 208.

Figure 3:
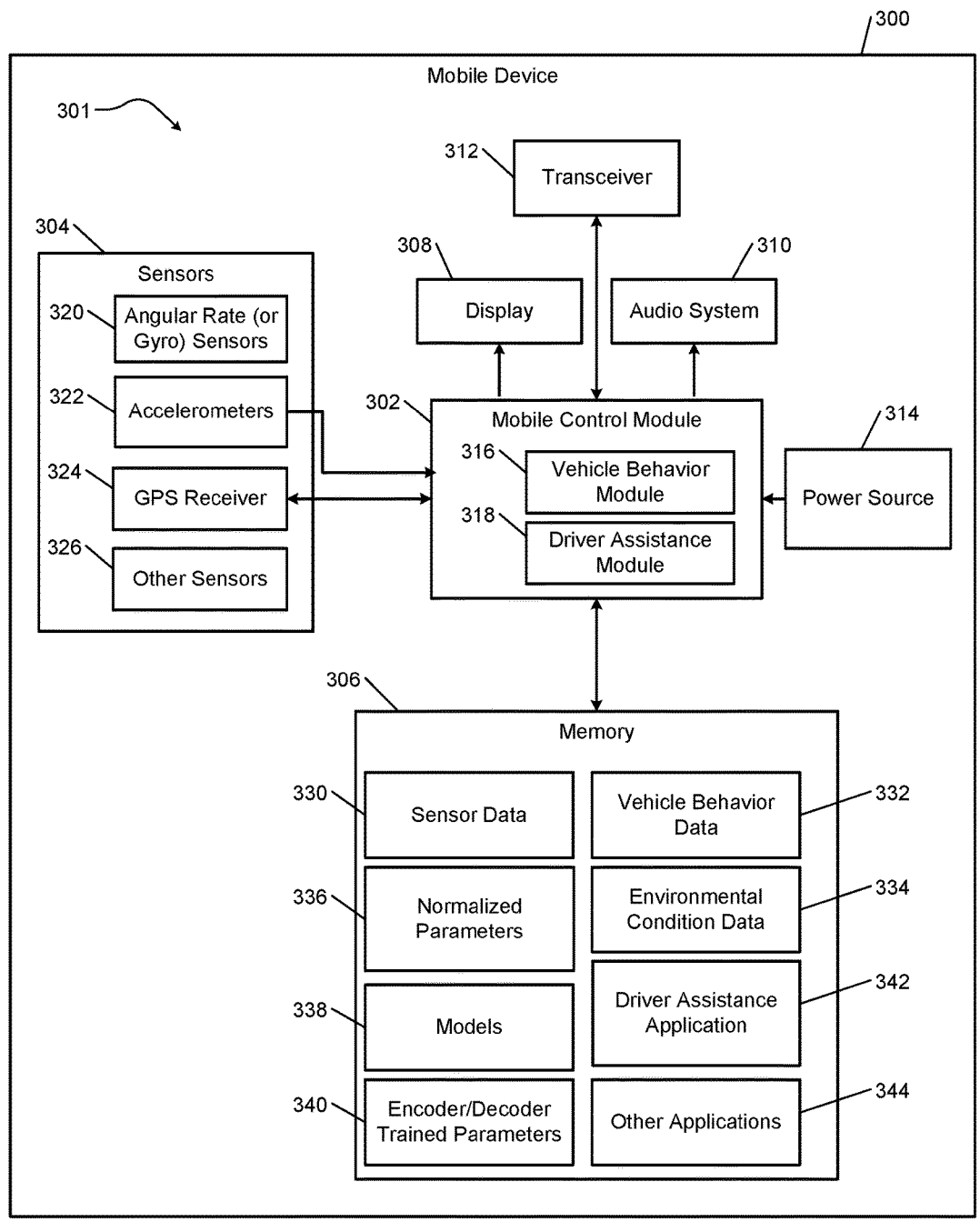
FIG. 3 is a functional block diagram of an example of a vehicle including a driver assistance module in accordance with an embodiment of the present disclosure.

FIG. 3 shows a mobile device 300 that may replace and/or operate similarly to the mobile device 104 of FIG. 1. The mobile device 300 may be a mobile phone, a laptop computer, a personal data assistant device, a wearable device, and/or other portable network device. The mobile device 300 includes a driver assistance system 301, which may include a mobile control module 302, sensors 304, a memory 306, a display 308, an audio system 310, a transceiver 312, and a power source 314. The mobile control module 302 may include a vehicle behavior module 316 and a driver assistance module 318. The vehicle behavior modules 129, 129', 129" of FIG. 1 may perform one or more of the same operations as the vehicle behavior module 316 and thus may operate similar or the same as the vehicle behavior module 316. The vehicle behavior module 316 monitors outputs of the sensors 304 to generate vehicle behavior signals as further described below. The driver assistance module 318 based on the outputs of the sensors, the output of the driver behavior module 316, determined driver behavior, environmental operating conditions, and/or other data stored in the memory 306 provides driver assistance. This may include generating, transmitting, displaying signals and/or generating audible signals to alert and/or assist a vehicle operator.

The sensors 304 may include an angular rate (or gyro) sensors 320, accelerometers 322, a GPS receiver 324, and/or other sensors 326. The vehicle behavior module 316 generates vehicle behavior signals based on outputs of the sensors 320, 322, 324, 326.

The memory 306 stores sensor data 330 received from the sensors 320, 322, 324, 326. The memory 306 also stores vehicle behavior data 332, environmental condition data 334, normalized parameters 336, models 338, encoder/decoder trained parameters 340, driver assistance application 342, and other applications 344. The normalized parameters 336, the models 338, the encoder/decoder trained parameters 340 and the driver assistance application 342 are described below with respect to the embodiments of FIGS. 4-6. The method of FIG. 5 may be implemented while executing the driver assistance application 342.

The driver assistance module 318 may display driver assistance signals on the display 308 and/or provide driver assistance audible alerts via the audio system 310. The modules 302, 316, 318 may communicate with a server of a cloud-based network and/or with modules in a vehicle via the transceiver 312 this may include transmission of vehicle behavior signals and/or driver assistance signals.

Figure 4:
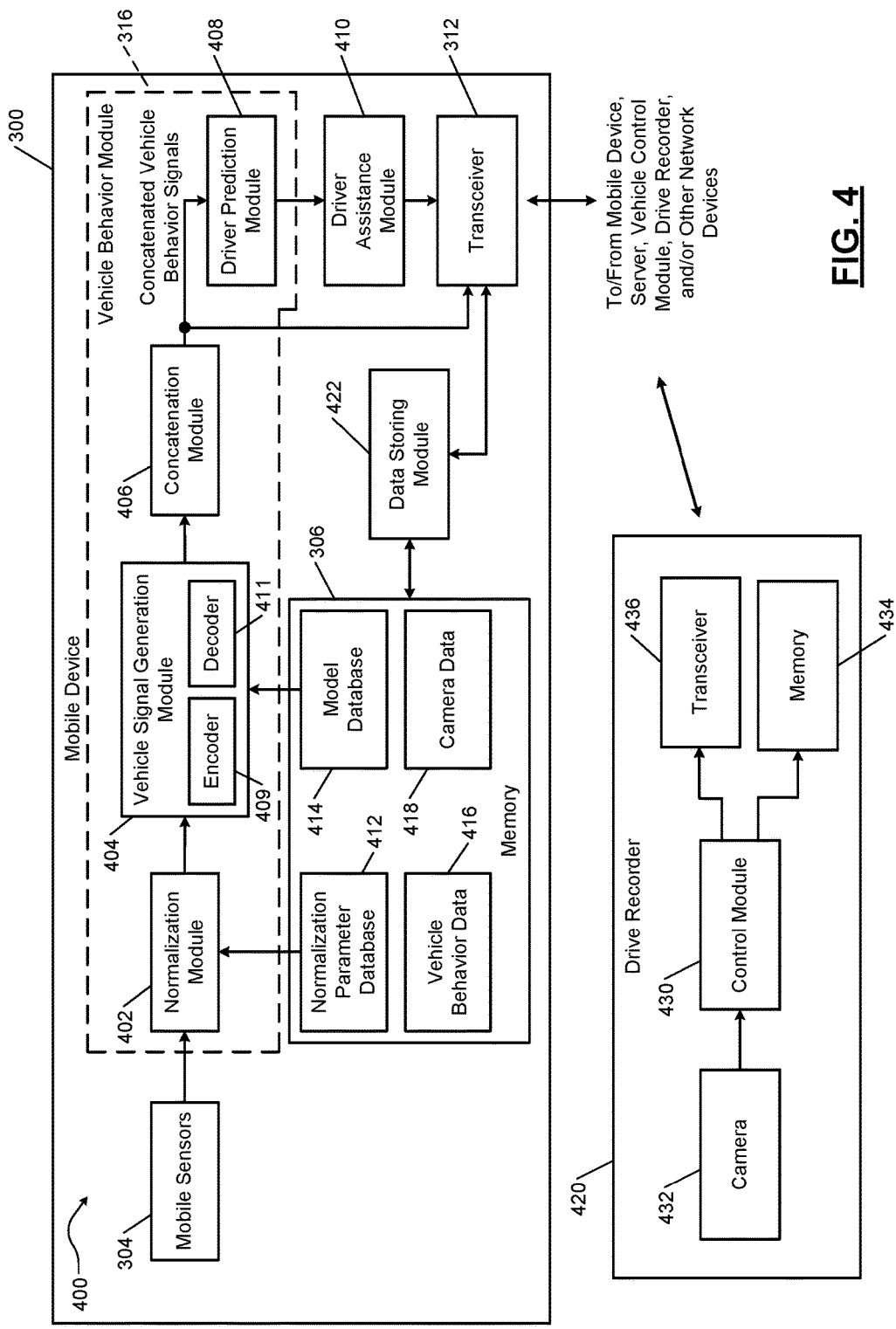
FIG. 4 is a functional block diagram of an example of a portion of the mobile device of FIG. 3 and a drive recorder in accordance with an embodiment of the present disclosure.

FIG. 4 shows a portion 400 of the mobile device 300 of FIG. 3 illustrating details of the vehicle behavior module 316. The portion 400 includes the mobile sensors 304, the memory 306, a normalization module 402, a vehicle signal generation module 404, a concatenation module 406, a driver prediction module 408, a driver assistance module 410, and a transceiver 312. The vehicle signal generation module 404 includes an encoder 409 and a decoder 411 and translates mobile sensor signals to pseudo driver behavior signals (referred to herein simply as "vehicle behavior signals"). The generated driver behavior signals are referred to as "pseudo vehicle behavior signals" because these signals are not generated by a control module of a vehicle and/or detected on a CAN bus. The pseudo vehicle behavior signals are rather generated by the mobile device 300 and estimate actual vehicle behavior signals that may be generated by a control module of the vehicle if the vehicle is configured and capable of providing these signals. Operation of the modules 402, 404, 406, 408, 410, the encoder 409 and the decoder 411 are further described with respect to the below method of FIG. 5.

The memory 306 stores a normalization parameter database 412, a model database 414, and vehicle behavior data 416. The memory 306 may also store camera data 418. The camera data 418 may be generated by a camera in the mobile device 300 and/or received from a drive recorder 420. A data storing module 422 may store data received via the transceiver 312 in the memory 306 and/or transmit data stored in the memory 306 to a server of a cloud-based network, a vehicle control module, and/or other network device.

As an example, the drive recorder 420 is shown and may include a recorder control module 430, a camera 432, a memory 434 and a transceiver 436. The drive recorder 420 may be mounted, for example, on an interior side of a windshield of a vehicle and record an area forward of the vehicle. The camera 432 may be used to image the area forward of the vehicle. The recorder control module 430 records the images and/or a corresponding video in the memory 434. This may occur prior to or while the vehicle behavior module 316 is monitoring and converting mobile sensors signals to vehicle behavior signals. The images and/or video may be transmitted to the vehicle behavior module 316, the driver assistance module 318 of FIG. 3 and/or the driver prediction module 408.

Figure 5:
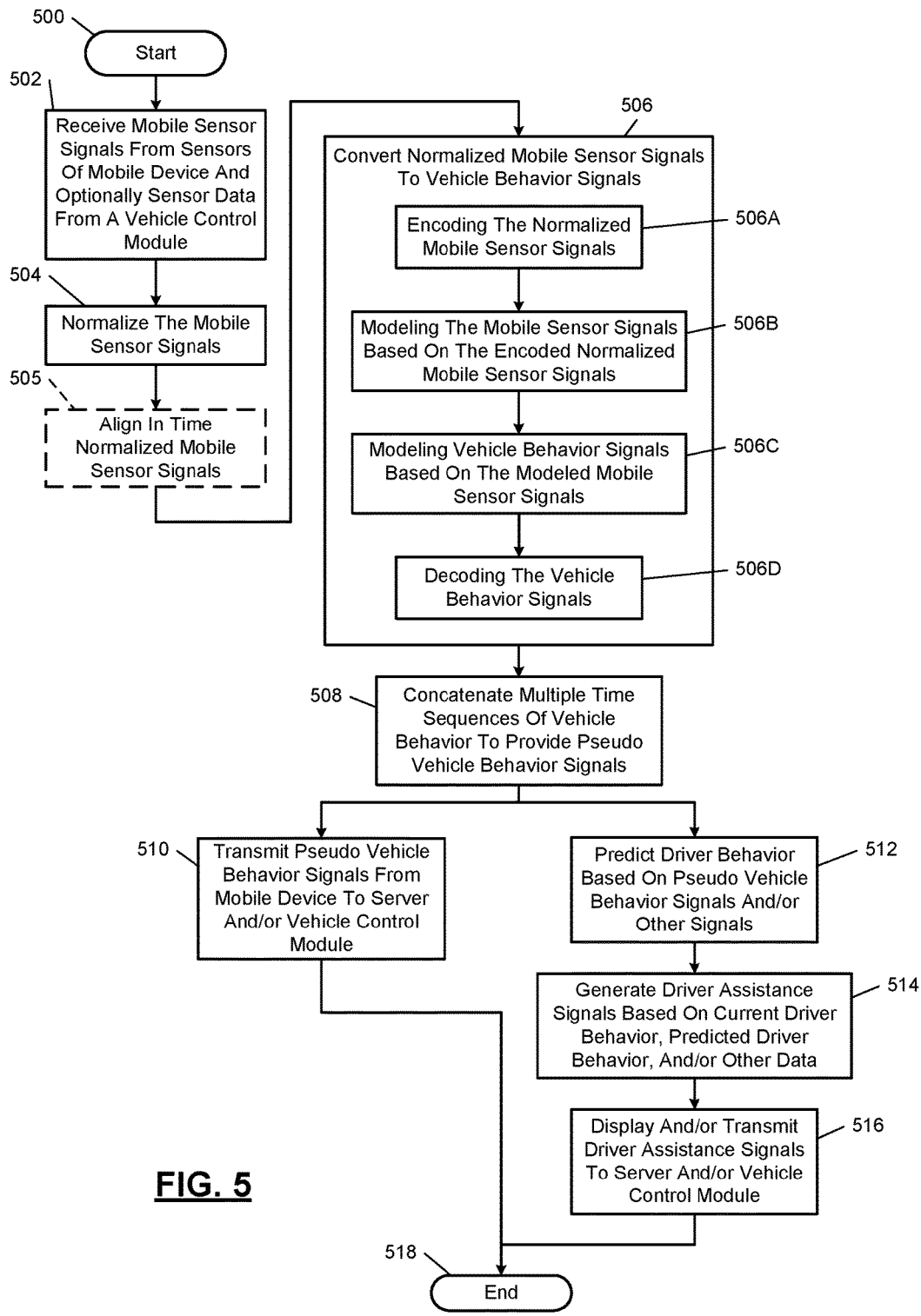
FIG. 5 illustrates a driver assistance method including a method of generating pseudo-vehicle behavior signals in accordance with an embodiment of the present disclosure.

The systems disclosed herein may be operated using numerous methods, example methods are illustrated in FIG. 5. In FIG. 5, a driver assistance method including a method of generating pseudo vehicle behavior signals is shown. Although the following operations are primarily described with respect to the implementations of FIGS. 1-4 and 6, the operations may be easily modified to apply to other implementations of the present disclosure. The operations may be iteratively performed. The method may begin at 500. At 502, the normalization module 402 receives mobile sensor signals from the mobile sensors 304 and normalizes the mobile sensor signals. In one embodiment, the normalization module 402 also receives sensor data from the vehicle control module 204. This may include, for example, vehicle acceleration data, vehicle velocity data, vehicle heading data, etc. Sensor signals generated by the sensors 214 and/or the GPS receiver 224 and corresponding differential values may be sent to the normalization module 402. As an example, the normalization module 402 may sample each sensor signal at a 10 Hertz (Hz) rate and/or receive data sampled from the sensor signals at a 10 Hz rate.

The normalization allows for easier timing alignment of the mobile sensor signals and timing alignment between signals received from multiple vehicles of the same and/or different types. A vehicle type refers to a year, make, model, and trim level of the vehicle. This can be helpful when performing timing alignment of signals from different devices and/or vehicles in a server (e.g., the server 108) of a cloud-based network, the driver prediction module 408, the driver assistance module 410, the vehicle behavior module 316, and/or the driver assistance module 318.

At 504, the normalization module 402 normalizes the received sensor signals and/or sensor data to provide normalized signals based on pre-fixed normalization parameters, such as the normalization parameters stored in the normalization parameter database 412. The pre-fixed normalization parameters may include: minimum and maximum range values; an indicator of whether to determine a mean and/or a variance; a distribution type; and/or other normalization parameters. In an embodiment, the normalization module 402 normalizes sensor signals and data into a fixed value range such as [−1 1] or [0 1], or arranges the corresponding data into a normal distribution having a mean (e.g., of 0) and a variance (e.g., of 1).

At 505, if not already aligned, the resultant normalization signals generated by the normalization module 402 may be aligned in time subsequent to being converted to vehicle behavior signals. Alignment in time refers to aligning the signals, such that data points of the signals for a current event are correlated based on time. This prevents evaluating data that was detected at different times and/or performing operations based on misaligned data. As an example, each signal may have a time reference point, and/or an event, which allows the signals to be aligned. The stated alignment may be performed by any of the modules 302, 402, 404. This alignment may be performed between operations 504 and 506 or at a different point during this method. The normalization results are sent to the vehicle signal generation module 404 based on a fixed time-window (e.g., 10 seconds, 100 data points with 10 Hz observation per normalized signal).

At 506, the vehicle signal generation module 404 converts (or translates) the normalized signals to vehicle behavior signals. The vehicle signal generation module 404 generates pseudo-vehicle behavior signals based on the normalized signals via a machine learning (ML) model. As an example, a deep neural network may be used as the ML model. In an embodiment, an encoder-decoder sequence-to-sequence prediction model is used, which includes a deep neural network. An example of an encoder-decoder sequence-to-sequence prediction model 600 (referred to as "the model") is shown in FIG. 6 and further described below.

The model is pre-trained and resulting trained parameter values of the model are stored in the model database 414. Once the model is trained, translations are performed based on the trained parameter values. During training, predetermined normalized signals may be provided to the inputs of the encoder 602 having corresponding predetermined known outputs. The predetermined known outputs are compared to actual outputs generated based on the predetermined normalized signals and the parameter values are adjusted until errors between the predetermined known outputs and the actual outputs are minimized. The parameter values may include weights, coefficients, constants, and/or other parameter values.

By using the model, the vehicle signal generation module 404 generates estimated vehicle behavior signals having a same length in time (e.g., 30 seconds each) as the received data sequences of the received mobile sensor signals and vehicle sensor data. As an example, the vehicle signal generation module 404 may operate at 10 Hz (generating 10 samples of data in every one second) and generates four types of vehicle behavior signals including a vehicle velocity signal, a steering wheel angle signal, a gas pedal operation signal, and a brake pedal operation signal.

Figure 6:
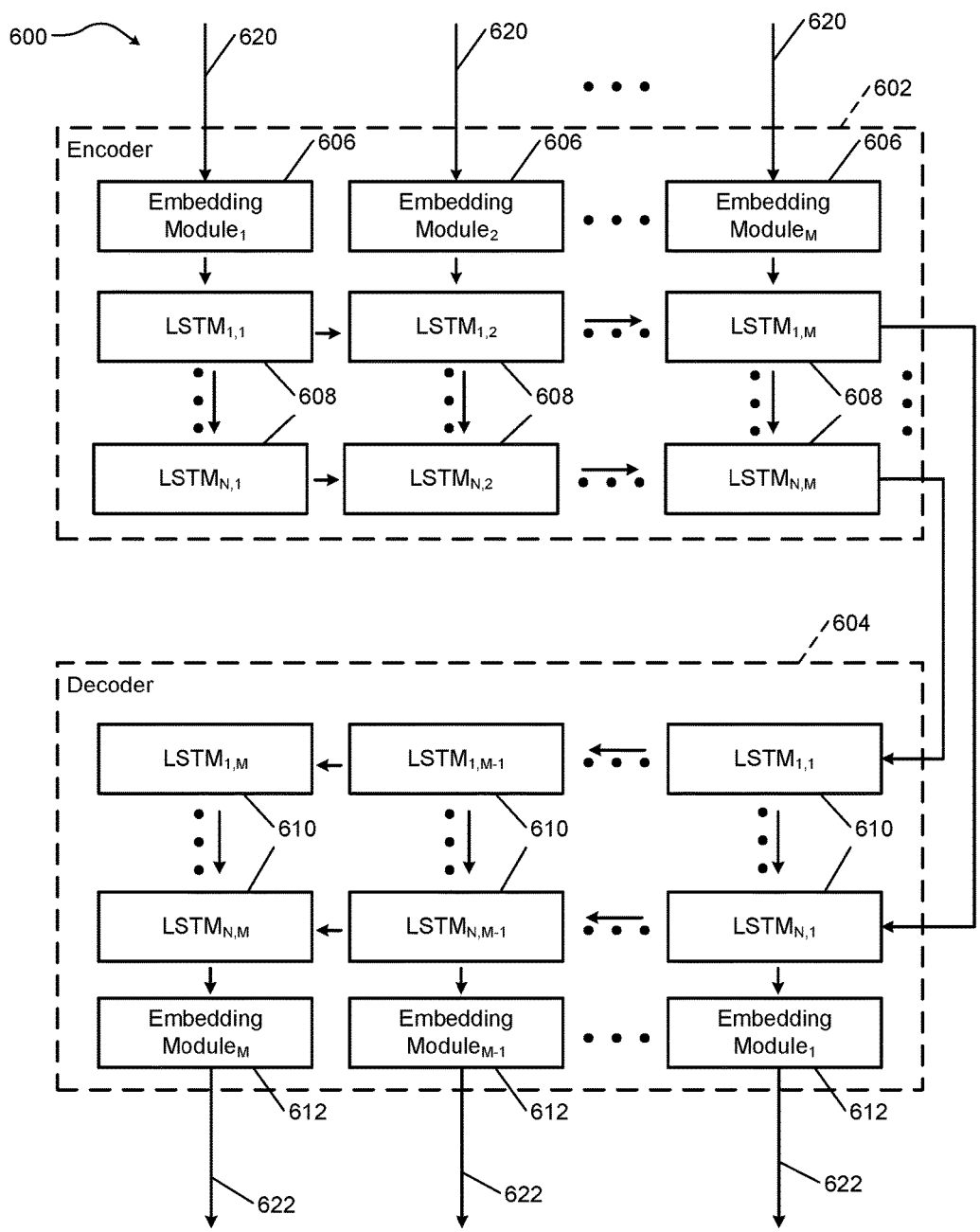
FIG. 6 is a functional block diagram of an example of an encoder-decoder sequence-to-sequence model of the vehicle signal generation module of FIG. 4.

The encoder-decoder sequence-to-sequence prediction model 600 of FIG. 6 includes an encoder 602, and a decoder 604. The encoder 602 includes first embedding modules 606 and first long short-term memory (LSTM) modules 608 in a corresponding one or more layers. The LSTM modules referred to herein are building units for layers of a recurrent neural network (RNN). A RNN is composed of LSTM modules and is often called an LSTM network. A common LSTM module (or unit) is composed of a cell, an input gate, an output gate and a forget gate. The cell is responsible for "remembering" values over arbitrary time intervals; hence the word "memory" in LSTM. Each of the three gates may be referred to as a "conventional" artificial neuron, as in a multi-layer (or feedforward) neural network. The gates compute an activation (using an activation function) of a weighted sum. Intuitively, the gates can be thought of as regulators of the flow of values that go through the connections of the LSTM; hence the denotation "gate". There are connections between these gates and the cell. The expression long short-term refers to the LSTM being a model for short-term memory, which can last for a long period of time.

Each row of the first LSTM modules 608 may be referred to as a layer. In one embodiment, only 1 layer is used. In another embodiment, 3 layers are used. The decoder 604 includes second LSTM modules 610 in a corresponding one or more layers and second embedding modules 612. The decoder 604 performs a similar process as the encoder, but in a reverse order. The LSTM modules 608, 610 may be stacked in corresponding LSTM layers to utilize multiple time-constant dynamics. The encoder encodes input time-series signals and the decoder generates output time-series signals. In an embodiment, a predetermined number of columns (e.g., 300 columns) of the modules 606, 608, 610, 612 are included. The first LSTM modules 608 may be arranged in an array including rows and columns. Similarly, the second LSTM modules 610 may be arranged in an array including rows and columns.

The first embedding modules 606 may be arranged in a first row of the encoder 602 and receive normalized signals (designated by arrows 620). Each of the arrows 620 may represent one or more normalized signals corresponding to one or more outputs of mobile sensors and/or vehicle sensors. As an example, each of the arrows 620 may represent normalized signals generated based on outputs from 5 mobile sensors on the mobile device 300. Each of the first embedding modules 606 may receive a frame from each of the 5 mobile sensors. If the encoder 602 has 300 columns of inputs for each sensor worth of data and the encoder 602 receives and/or samples the data at 10 Hz and during 30 second time windows, then 300 frames of data is received across the 300 inputs during each 30 second time period.

Each of the embedding modules 606 may be configured to sample the data based on overlapping windows, where each consecutive window is shifted from a previous window by a same predetermined amount of time. For example, if the windows have a 25% overlap, then an ending 25% of data collected during a first window may be repeated as a beginning 25% of a next consecutive window. This pattern may be repeated for each consecutive pair of embedding modules. This is further described below.

At 506A, the first embedding modules 606 may be implemented as a linear projection autoencoder and encode the normalized signals and/or perform another feature representation function. The linear projection autoencoder may perform a linear combination of normalized signals and extract summarized features. The embedding modules 606 may provide a more abstract representation of normalized signals than the first LSTMs 608. As an example, if X, Y, Z acceleration data is received, these signals may be combined in a weighted sum as represented by equation 1, where C1, C2, C3 are constants, x, y, z are acceleration data in X, Y, Z directions, and SUM is the resultant sum.

$$\text{SUM} = C_1 X + C_2 Y + C_3 Z \tag{1}$$

As an alternative, a non-linear combination may be provided by, for example, determining a hyperbolic tangent (tanh) of the sum.

At 506B, the first LSTM modules 608 model the model sensor signals and/or the vehicle data based on the outputs of the embedding modules 606. The first LSTM modules 608 may map input sequences to vectors of a fixed dimensionality. The first LSTM module 608 may read the input sequences, one timestep at a time, to obtain large fixed-dimensional vector representations. Each of the rows of the first LSTM modules 608 may model different speed dynamics and/or provide another level of estimation. The more layers included, the better and/or smoother the estimated output signals. Each additional row and/or column provides a more filtered and closer estimate of pertinent sensor data to be translated. The first LSTM modules 608 provide a row-by-row column-by-column convergence to resultant output values.

At 506C, the second LSTM modules 610 model vehicle behavior signals based on the outputs of the last ones of the first LSTM modules 608. The second LSTM modules 610 may decode the vectors to provide target or output sequences. The second LSTM modules 610 extract the output sequences from the vectors. Each of the rows of the second LSTM modules 610 may model different speed dynamics and/or provide another level of estimation. The more layers included, the better and/or smoother the estimated output signals. Each additional row and/or column provides a more filtered and closer estimate of the vehicle behavior signals being estimated. The second LSTM modules 610 provide a row-by-row column-by-column convergence to resultant output values.

At 506D, the second embedding modules 612 decode outputs of the last row of the second LSTM modules 610 to provide resultant pseudo vehicle behavior signals. The second embedding modules 612 may be implemented as a linear projection autodecoder.

A multi-task learning approach may be implemented to generate more accurate signals. Although FIG. 6 shows a single encoder receiving multiple signals in parallel and a single decoder outputting multiple signals in parallel, as an alternative, the outputs of the encoder may be provided to each of multiple decoders. Multi-task learning may be implemented for encoders and for decoders. For example, four decoders may be used to generate four vehicle behavior signals independently. The four vehicle behavior signals may be the vehicle velocity signal, the steering wheel angle signal, the gas pedal operation signal, and the brake pedal operation signal. The vehicle behavior signals are sent to the concatenation module 406.

At 508, the concatenation module 406 concatenates time series (or time sequences) of the outputs of the second embedding modules 612 to form multiple time-series of data representing vehicle behavior in the form of pseudo-vehicle behavior signals (e.g., pseudo-vehicle behavior signals 622). A predetermined amount of concatenation may be performed. For example, 60 consecutive 30 second time sequences may be concatenated to provide a 30 minute time sequence. The pseudo-vehicle behavior signals may be referred to as pseudo-CAN signals and may be used in a similar manner as CAN messages. The concatenation module 406, for each vehicle behavior signal being estimated, concatenates estimated time sequences to form a single resultant time sequence. The resultant time sequence may be provided by calculating a mean value of the generated time sequences, for the vehicle behavior signal being estimated, at each time step (e.g., for 10 Hz sampling each time step is 0.1 seconds). As an alternative, a weighted mean may be calculated, a Gaussian process may be performed, or a simple concatenation may be performed.

As another example, weighted means may be calculated for overlapping portions of the time sequences of the vehicle behavior signal being estimated to provide a continuous sequence of data, where the portions of the sequences of data corresponding to overlapping portions of the time sequences are set at the weighted mean values. This may be referred to as a sliding window approach, where weighted means are calculated for portions of the time sequences that are within the sliding window and the start and end times of the window are adjusted to calculate means for respective overlapping portions of the sequences. As an example, each of the time sequences used to estimate a vehicle behavior signal may have 30 seconds of data, where 75% of the each of the windows is overlapped by a next consecutive window. As a result, a first window may be overlapped partially by multiple upcoming windows. A sliding window may be equal to 10% a length of the 30 second windows or 3 seconds in length. The data in the time sequences that fall in the time period associated with the sliding window is averaged and/or a mean is calculated and used for that period of time. The start and end times of the sliding window are then, for example, incremented or increased by a predetermined amount to calculate the next mean for the next overlapping portion of the sequences. This process may be repeated until continuous data for a predetermined amount of time (e.g., 30 minutes) is provided.

At 510, the pseudo vehicle behavior signals are transmitted from the mobile device to the server 108 and/or the vehicle control module 204. The driver assistance module 211 of the vehicle may then generate alerts, warnings and/or driver assistance signals via the infotainment system based on the pseudo vehicle behavior signals and/or other information collected from the sensors 214, the GPS receiver 224, and/or the memory 218. This may include indicating to the driver to increase brake pressure, decrease acceleration pedal pressure, turn steering wheel in a certain direction, etc.

At 512, the driver prediction module 408 may predict behavior of a driver based on the pseudo vehicle behavior signals, the mobile sensor signals, video data from the drive recorder 420, data from vehicle sensors, and/or other data. This may include predicting steering wheel angles, brake pedal positions, accelerator pedal positions, vehicle velocities, accelerations, decelerations, and/or more high level driving behaviors, such as turning right/left, lane changing, stopping, etc. This allows the driver assistance module 318 to determine whether the driver is responding appropriately to certain environmental conditions.

At 514, the driver assistance module 318 generates driver assistance signals based on current driver behavior as indicated by the pseudo-vehicle behavior signals, the predicted driver behavior, and/or other information, such as that from the mobile sensor signals, video data from the drive recorder 420, environmental condition data, and vehicle sensor data. The stated signals and information allows the driver assistance module 318 to detect a traffic event, have information regarding how the driver is currently operating the vehicle and reacting to current conditions, predict how the driver is to respond to the traffic event, and respond accordingly. All of this information may be transmitted from the mobile device 300 to the server 108.

At 516, the driver assistance signals may be provided to the driver via the display 308 and/or audio system 310. This may also include recommendations to increase brake pressure, decrease acceleration pedal pressure, turn steering wheel in a certain direction, etc. The method may end at 518 subsequent to performing operations 510, 516.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The vehicle assistance modules and systems disclosed herein enable collecting and storing of vehicle behavior signals from within conventional vehicles, which may not have electronics for collecting, transmitting and/or recording vehicle behavior signals. The vehicle behavior signals are generated by the disclosed mobile devices, which may be disposed within the vehicles. The vehicle behavior signals may be stored in the mobile devices and/or transmitted to a server of a cloud-based network and/or to other vehicles. The mobile devices may receive, store and/or transmit data from a drive recorder located in a vehicle to a control module in the vehicle and/or to the server.

By implementing the described example, a rich driving experience is provided on conventional vehicles. Driver assistance is provided on a conventional vehicle with use of simple and/or inexpensive sensors located in a mobile device and/or drive recorder. Mobile sensor to vehicle behavior signal translation is performed while accounting for time delays and minimizing noise via filtering integrated in the translation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A mobile network device comprising:
a memory configured to store a driver assistance application; and
a control module configured to execute the driver assistance application and when executing the driver assistance application the control module is configured to
receive mobile sensor signals from a plurality of sensors in the mobile network device,
normalize the mobile sensor signals to generate normalized signals,
convert the normalized signals to a plurality of time sequences representing vehicle behavior,
concatenate the plurality of time sequences to generate pseudo-vehicle behavior signals, and
generate driver assistance signals based on the pseudo-vehicle behavior signals to assist a driver of a vehicle.

2. The mobile network device of claim 1, wherein the pseudo-vehicle behavior signals represent controller area network signals of the vehicle.

3. The mobile network device of claim 1, further comprising the plurality of sensors, wherein the plurality of sensors include an accelerometer, an angular rate sensor, and a global positioning system receiver.

4. The mobile network device of claim 1, wherein the control module comprises:
an encoder configured to model the mobile sensor signals; and
a decoder configured to receive outputs of the encoder and model the pseudo-vehicle behavior signals.

5. The mobile network device of claim 4, wherein:
the encoder comprises
a first plurality of embedding modules, and
a first plurality of long-short term memories; and
the decoder comprises
a second plurality of long-short term memories, and
a second plurality of embedding modules.

6. The mobile network device of claim 4, wherein:
the encoder comprises
a row of first embedding modules, and
a first array of long-short term memories; and
the decoder comprises
a second array of long-short term memories, and
a row of second embedding modules.

7. The mobile network device of claim 6, wherein:
each of the first embedding modules corresponds to and provides an output to a respective column of the first array of long-short term memories; and
each of the second embedding modules corresponds to and receives an output from a respective column of the second array of long-short term memories.

8. The mobile network device of claim 6, wherein:
the first array of long-short term memories maps input sequences to vectors of a fixed dimensionality; and
the second array of long-short term memories decodes the vectors to provide target or output sequences.

9. The mobile network device of claim 4, wherein the control module is configured to generate the pseudo-vehicle behavior signals based on a sequence-to-sequence prediction model including a deep neural network.

10. The mobile network device of claim 4, wherein the decoder is configured to receive the outputs of the encoder including the model and model the pseudo-vehicle behavior signals based on the model of the mobile sensor signals.

11. The mobile network device of claim 10, wherein a first column of the second array of long-short term memories receives outputs from a last column of the first array of long-short term memories.

12. The mobile network device of claim 1, further comprising a driver prediction module configured to predict behavior of the driver based on the pseudo-vehicle behavior signals,
wherein the control module is configured to generate the driver assistance signals based on the predicted behavior of the driver.

13. The mobile network device of claim 1, wherein when executing the driver assistance application the control module is configured to:
receive image data transmitted from a drive recorder to the mobile network device, wherein the drive recorder is separate from the mobile network device and is disposed in the vehicle; and
generate the driver assistance signals based on the image data.

14. The mobile network device of claim 1, wherein when executing the driver assistance application the control module is configured to:
receive vehicle sensor data transmitted from the vehicle to the mobile network device; and
generate the driver assistance signals based on the vehicle sensor data.

15. The mobile network device of claim 1, wherein mobile network device is a mobile phone, a notebook computer, a personal data assistant device, a wearable device, a dashboard camera or a drive recorder.

16. The mobile network device of claim 1, wherein the translating of the normalized signals comprises:
encoding the normalized mobile sensor signals;
modeling the mobile sensors signals based on the encoded and normalized mobile sensor signals;
modeling vehicle behavior signals based on the modeled mobile sensor signals; and
decoding the vehicle behavior signals.

17. The mobile network device of claim 1, further comprising a linear projection autoencoder configured to encode the normalized mobile sensor signals to generate a weighted sum of data in the normalized mobile sensor signals,
wherein the plurality of time sequences are generated based on the weighted sum.

18. The mobile network device of claim 1, wherein the control module is configured to transmit the pseudo-controller area network signals from the mobile network device to the vehicle.

19. The mobile network device of claim 1, wherein the control module is configured to transmit the driver assistance signals from the mobile network device to the vehicle.

20. The mobile network device of claim 1, wherein the control module is configured to generate the driver assistance signals to at least one of autonomously steer, autonomously brake, or autonomously adjust speed of the vehicle.

21. The mobile network device of claim 1, wherein the pseudo-vehicle behavior signals include a steering wheel angle signal, a brake pedal position signal, and an accelerator pedal position signal.

22. A method of operating a mobile network device, the method comprising:
storing a driver assistance application in a memory of the mobile network device; and
executing the driver assistance application to
receive mobile sensor signals from a plurality of sensors in the mobile network device,
normalize the mobile sensor signals to generate normalized signals,
convert the normalized signals to a plurality of time sequences representing vehicle behavior,
concatenate the plurality of time sequences to generate pseudo-vehicle behavior signals, and
generate driver assistance signals based on the pseudo-vehicle behavior signals to assist a driver of a vehicle.

23. The method of claim 22, wherein the pseudo-vehicle behavior signals represent controller area network signals of the vehicle.

24. The method of claim 22, wherein the plurality of sensors include an accelerometer, an angular rate sensor, and a global positioning system receiver.

25. The method of claim 22, further comprising:
modeling the mobile sensor signals via an encoder; and
receiving outputs of the encoder at a decoder and modeling the pseudo-vehicle behavior signals via the decoder.

26. The method of claim 25, wherein:
the encoder comprises
a first plurality of embedding modules, and
a first plurality of long-short term memories; and
the decoder comprises
a second plurality of long-short term memories, and
a second plurality of embedding modules.

27. The method of claim 25, wherein:
the encoder comprises
a row of first embedding modules, and
a first array of long-short term memories; and
the decoder comprises
a second array of long-short term memories, and
a row of second embedding modules.

28. The method of claim 22, further comprising predicting behavior of the driver based on the pseudo-vehicle behavior signals,
wherein the driver assistance signals are generated based on the predicted behavior of the driver.

29. The method of claim 22, further comprising receiving image data transmitted from a drive recorder to the mobile network device, wherein the drive recorder is separate from the mobile network device and is disposed in the vehicle,
wherein the driver assistance signals are generated based on the image data.

30. The method of claim 22, further comprising receiving vehicle sensor data transmitted from the vehicle to the mobile network device,
wherein the driver assistance signals are generated based on the vehicle sensor data.

31. The method of claim 22, wherein the mobile network device is a mobile phone, a notebook computer, a personal data assistant device, or a wearable device.

* * * * *